(12) United States Patent
Foster et al.

(10) Patent No.: US 7,243,780 B1
(45) Date of Patent: Jul. 17, 2007

(54) CONVEYOR SLAT DRIVE BEAM CONNECTION

(75) Inventors: Raymond Keith Foster, Madras, OR (US); John Scott Cook, Madras, OR (US)

(73) Assignee: Keith Investments, LLC, Madras, OR (US)

( * ) Notice: Subject to any disclaimer, the term of this patent is extended or adjusted under 35 U.S.C. 154(b) by 0 days.

(21) Appl. No.: 11/298,215

(22) Filed: Dec. 9, 2005

(51) Int. Cl.
*B65G 25/04* (2006.01)

(52) U.S. Cl. ................................. 198/750.2; 198/750.4

(58) Field of Classification Search ............. 198/750.2, 198/750.3, 750.4, 750.5, 750.6
See application file for complete search history.

(56) References Cited

U.S. PATENT DOCUMENTS 5,996,772 A * 12/1999 Foster ..................... 198/750.3
6,000,530 A * 12/1999 Foster ..................... 198/750.6
6,409,009 B1 * 6/2002 Foster ..................... 198/750.2
6,575,293 B2 * 6/2003 Foster ..................... 198/750.2
6,848,569 B1 * 2/2005 Foster ..................... 198/750.2

* cited by examiner

*Primary Examiner*—James R. Bidwell
(74) *Attorney, Agent, or Firm*—Delbert J. Barnard (57) ABSTRACT

A screw (114) is rotated to move a head (110, 110') against a first squeeze bar (30) and through a threaded opening (114) in a second squeeze bar (32), for moving the squeeze bars (30, 32) relatively together. This movement rotates cam bars (100, 102, 104, 106) in position, causing them to move a lower spread bar (24) away from an upper spread bar (22). This pulls downwardly on a bolt (16) which is connected to the lower spread bar (24). As the bolt (16) moves downwardly, its head (18) pushes downwardly on an upper clamp member (52'), moving it towards a lower clamp member (54"). This firmly clamps bottom flanges (78, 80) on a conveyor slat (70) between the upper and lower clamps member (52", 54"), firmly securing the slat (70) to a transverse drive beam (56').

7 Claims, 7 Drawing Sheets

CONVEYOR SLAT DRIVE BEAM CONNECTION

TECHNICAL FIELD

The present invention relates to reciprocating slat conveyors. More particularly, it relates to apparatus for connecting the conveyor slats to the transverse drive beams by clamping onto bottom flange portions of the conveyor slats by use of a clamping structure operated by screws that are accessible from the ends of the drive beams.

BACKGROUND OF THE INVENTION

The Background of the Invention section in my U.S. Pat. No. 6,575,293 B2, granted Jun. 10, 2003, and the patent itself, are incorporated herein to form the Background of the Invention section of this patent.

My U.S. Pat. No. 6,575,293 B2 discloses an upper clamp member designated 52 in FIG. 14 of that patent which fits into the conveyor slat that is designated 70 in FIG. 14 of that patent. Inwardly directed bottom flanges 78, 80 on the conveyor slat 70 are disposed vertically between a first or upper clamp member 52 and a second or lower clamp member 54 that is carried by the transverse drive beam 56. U.S. Pat. No. 6,575,293 discloses pulling the two clamp members 52, 54 relatively together by use of vertical bolts that when tightened draw the two clamp members 52, 54 towards each other and into clamping engagement with the slat flanges 78, 80. In one embodiment, the bolts extend vertically upwardly and thread into openings in the upper clamp member 52. This construction is shown by FIG. 10 of U.S. Pat. No. 6,575,293 B2, for example. In another embodiment, the bolts extend downwardly through the clamp members 52", 54". A nut 230 is attached to the lower end of each bolt 226 and is rotated to draw the two clamp members 52", 54" together and into clamping engagement with the lower flanges of the conveyor slat.

The two embodiments disclosed by U.S. Pat. No. 6,575,293 B2, require access from below to either a bolt head or a nut that is positioned inside of the transverse drive beam. There is a need for a system for drawing the two clamping members together that does not require access from below to either a bolt head or a nut located inside of the transverse drive beam. There is a need for a clamp operating apparatus that includes an adjustment screw that is accessible from one end of the drive beam and is rotatable to cause the two clamp members to move relatively together into clamping engagement with the lower flanges of the conveyor slat. The principal object of the present invention is to fill these needs.

BRIEF SUMMARY OF THE INVENTION

According to the present invention, a first clamp member is positioned inside of a conveyor slat and a second clamp member is provided on top of a transverse drive beam. An elongated member extends downwardly through the two clamp members and into the transverse drive beam. There it engages a mechanism adapted to draw it downwardly and at the same time draw the first clamp member towards the second clamp member for clamping onto lower flange portions of the conveyor slat that are disposed between the two clamp members. The mechanism that draws the elongated member downwardly includes a horizontal screw with a head that is reachable from an end of the transverse drive beam. Rotation of the horizontal screw in one direction causes a pulling force to be applied to the elongated member, moving the two clamp members relatively together into clamping engagement with the bottom flanges of the conveyor slat.

According to an aspect of the invention, the mechanism for pulling the elongated member endwise comprises a pair of spaced apart, top and bottom spread bars having opposite sides. The elongated member extends downwardly through an opening in the top spread bar and at its lower end is connected to the bottom spread bar. A pair of spaced apart, first and second squeeze bars are positioned outwardly of the sides of the spread bars. The horizontal screw extends through an opening in the first squeeze bar and threads into a threaded opening in the second squeeze bar. The screw extends perpendicular to the elongated member and has a head in contact with the first squeeze bar. Cam bars are provided between portions of the spread bars and portions of the squeeze bars. The cam bars have first edges that engage the spread bars and second edges that engage the squeeze bars. The squeeze bars and the screw are adapted to move the squeeze bars relatively together in response to a rotation of the screw and a first direction. The spread bars, the squeeze bars and the cam bars are adapted to move the bottom spread bar downwardly and away from the top spread bar in response to such rotation of the screw. As the bottom spread bar moves downwardly, it pulls with it the elongated member.

In preferred form, the first and second edges of the cam bars are rounded and the spread bars and the squeeze bars include rounded grooves for receiving the rounded first and second edges of the cam bars.

In preferred form, the squeeze bars have a first position in which they are spaced apart a predetermined distance. When the squeeze bars are in the first position the cam bars lean over and converge as they extend from the squeeze bars to the spread bars. Movement of the two squeeze bars relatively together will push on the second ends of the cam bars and swing the cam bars towards a generally upright position, causing the cam bars to push the spread bars relatively apart.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWINGS

Like reference numerals are used to designate like parts throughout the several views of the drawing, and.

DETAILED DESCRIPTION OF THE ILLUSTRATED EMBODIMENT

Figure 1:
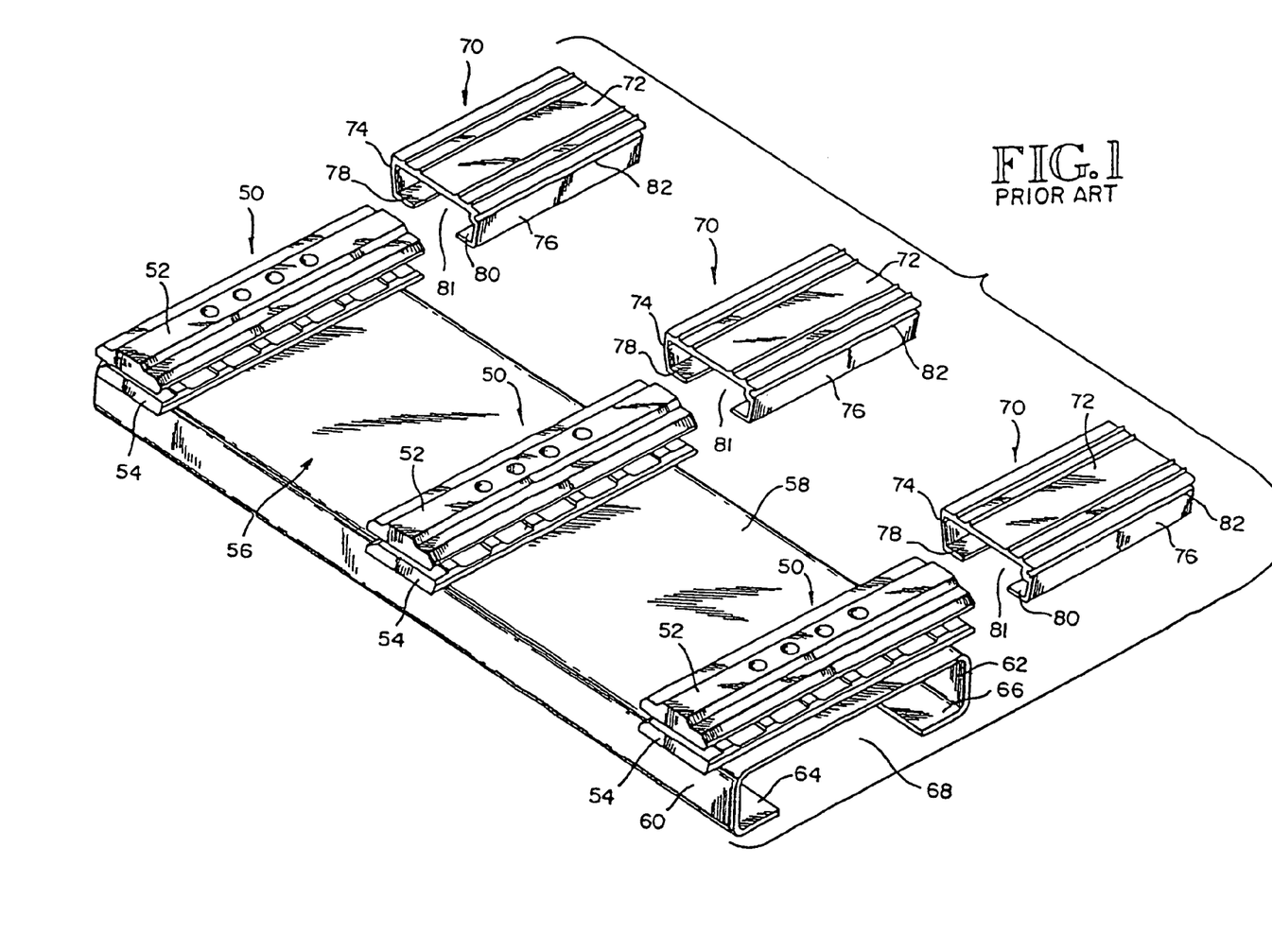
FIG. 1 is identical to FIG. 3 in U.S. Pat. No. 6,575,293 B2, including the reference numerals.

FIG. 1 shows a fragmentary end view of a transverse drive beam 56 having three slat connectors 50. By way of typical and therefore non-limitive example, a complete drive beam 56 may have eight slat connectors 50, four eight conveyor slats 70, the same as what is shown in FIG. 1 of U.S. Pat. No. 6,575,293 B2.

Figure 2:
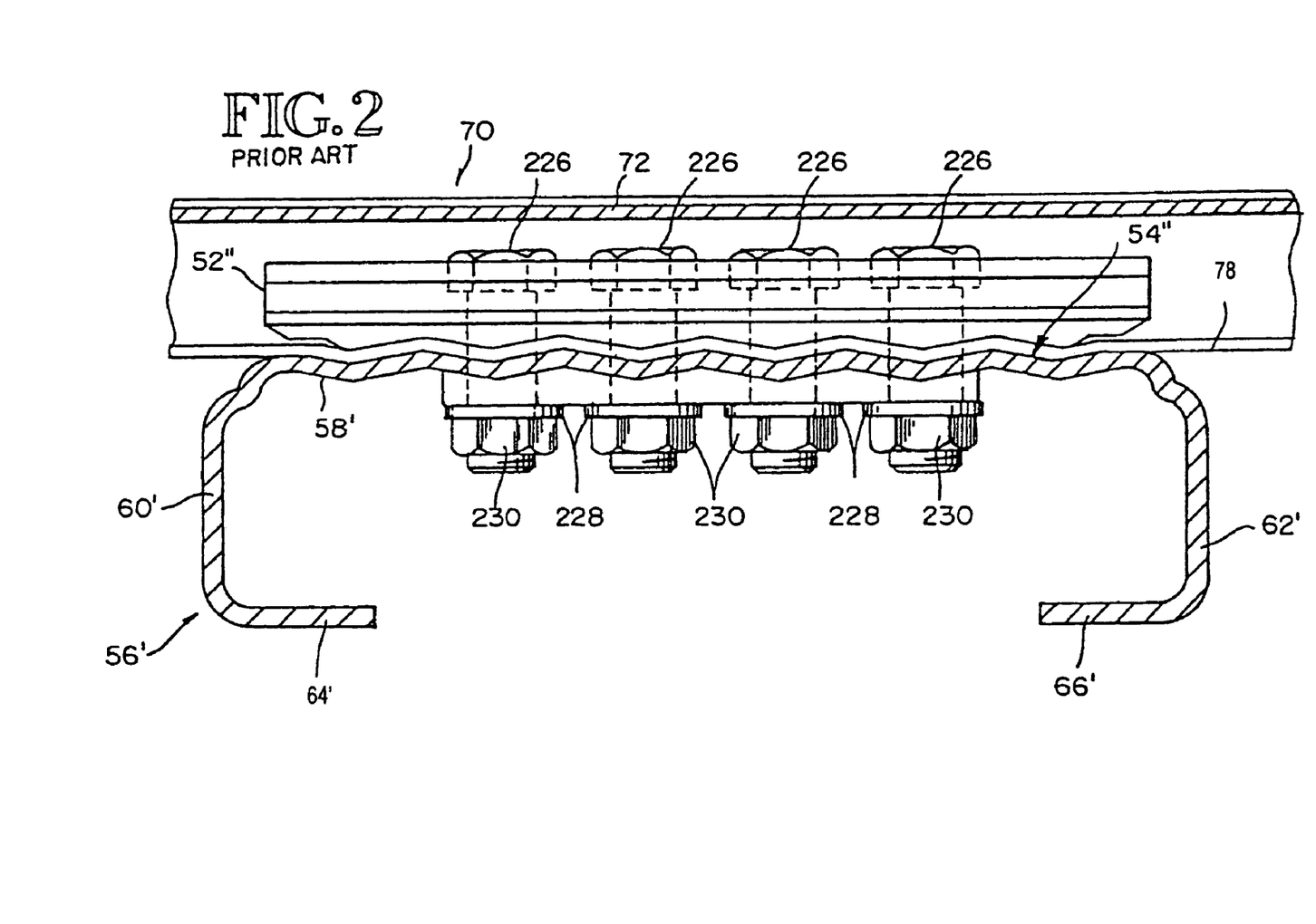
FIG. 2 is identical to FIG. 28 in U.S. Pat. No. 6,575,293 B2, including the reference numerals.

Drive beam 56 is preferably in the form of a flanged channel. It may be an extrusion and may have a top 58, a pair of sides 60, 62 and a pair of bottom flanges 64, 66. Space 68 between the bottom flanges 64, 66 provides access to the lower side of top 58. FIG. 1 shows that the slat connectors 50 include upper clamp members 52 that are removable and lower clamp members 54 that are fixed to the top panel 58 of the drive beam 52. The bottom clamp parts 54 may be welded to the top 58 of the drive beam 56, as shown in FIG. 1. Or, the lower clamp parts may be a formed portion of the drive beam, as shown in FIG. 2. In any event, the clamp members 52, 52", 54, 54" are elongated in the length direction of the conveyor slats 70 and are spaced apart laterally on the drive beam 56, 56'. Thus, clamp members 52, 52", 54, 54" extend longitudinally of the conveyor slats 70 and transversely of the drive beams 56, 56'.

The conveyor slats 70 each comprises a top 72, a pair of spaced apart sidewalls 74, 76 and a pair of bottom flanges 78, 80. The top 72, the sidewalls 74, 76 and the bottom flanges 78, 80 together define an inner space 81 in the slat 70. Specifically, the inner space 81 is defined horizontally between the side parts 74, 76 and vertically between top 72 and bottom flanges 78, 80. As is well-known in the art, each conveyor slat 70 may also be formed to include a seal strip receiving groove 82. By way of typical therefore non-limitive example, the seal strip (not shown) may be like any of the seal strips that are disclosed in my U.S. Pat. No. 5,655,645, granted Aug. 12, 1997, and entitled Seal Member for Reciprocating Slat Conveyor.

Figure 4:
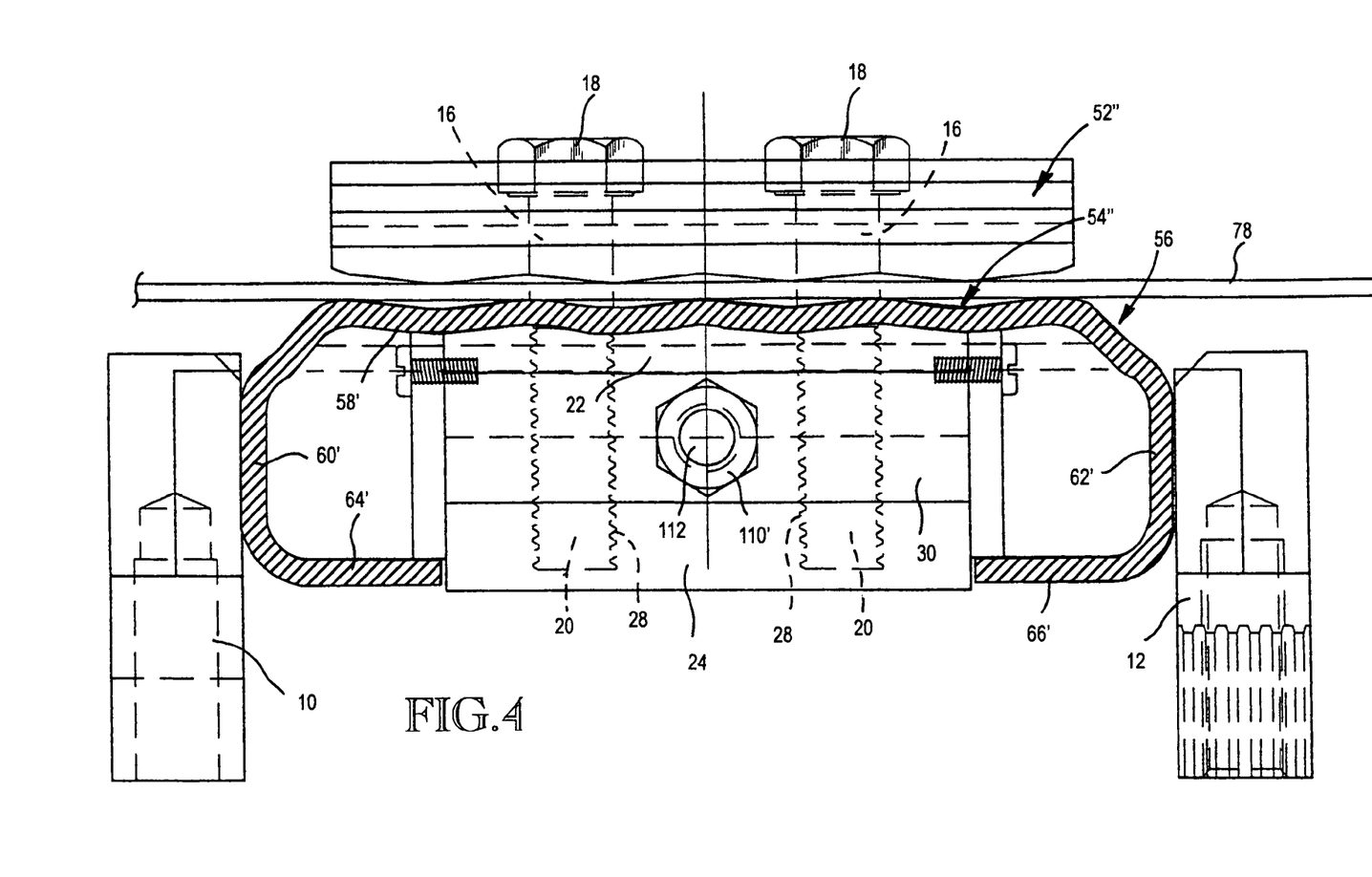
FIG. 4 is a view like FIG. 2 but of the assembly of the present invention.

Herein, by way of example, the transverse drive beam 56' is formed to include the lower clamp member and for that reason the reference numerals used in FIG. 2 will be used to designate the parts of the transverse drive beam 56'. Specifically, it includes an upper wall 58' that is configured to form the lower clamp member 54". It includes sidewalls 60', 62' that extend downwardly from the top 58' to the bottom flanges 64', 66'. Reference is made to U.S. Pat. No. 6,575, 293 B2 for a detailed description of the undulating clamp surfaces that form peaks and valleys which cooperate for deforming the bottom flanges 74, 80 on the conveyor slats 70. FIG. 4 shows upper clamp members 10, 12 that are connected to the sidewalls 60', 62' of the transverse drive beam 56'.

As clearly disclosed in my U.S. Pat. No. 4,793,469, granted Dec. 27, 1988, and entitled Reduced Size Drive/Frame Assembly for a Reciprocating Floor Conveyor, the upper clamp members 10, 12 are used with lower clamp members (not shown) for clamping the drive beam 56' to the drive cylinders that reciprocate the drive beams and the conveyor slats back and forth, first in a conveying direction and then in a retracting direction. The connection of the drive beams to the drive units is fully disclosed in my U.S. Pat. No. 4,793,469. To the extent needed, the disclosure of that patent is hereby incorporated herein by this specific reference.

Figure 3:
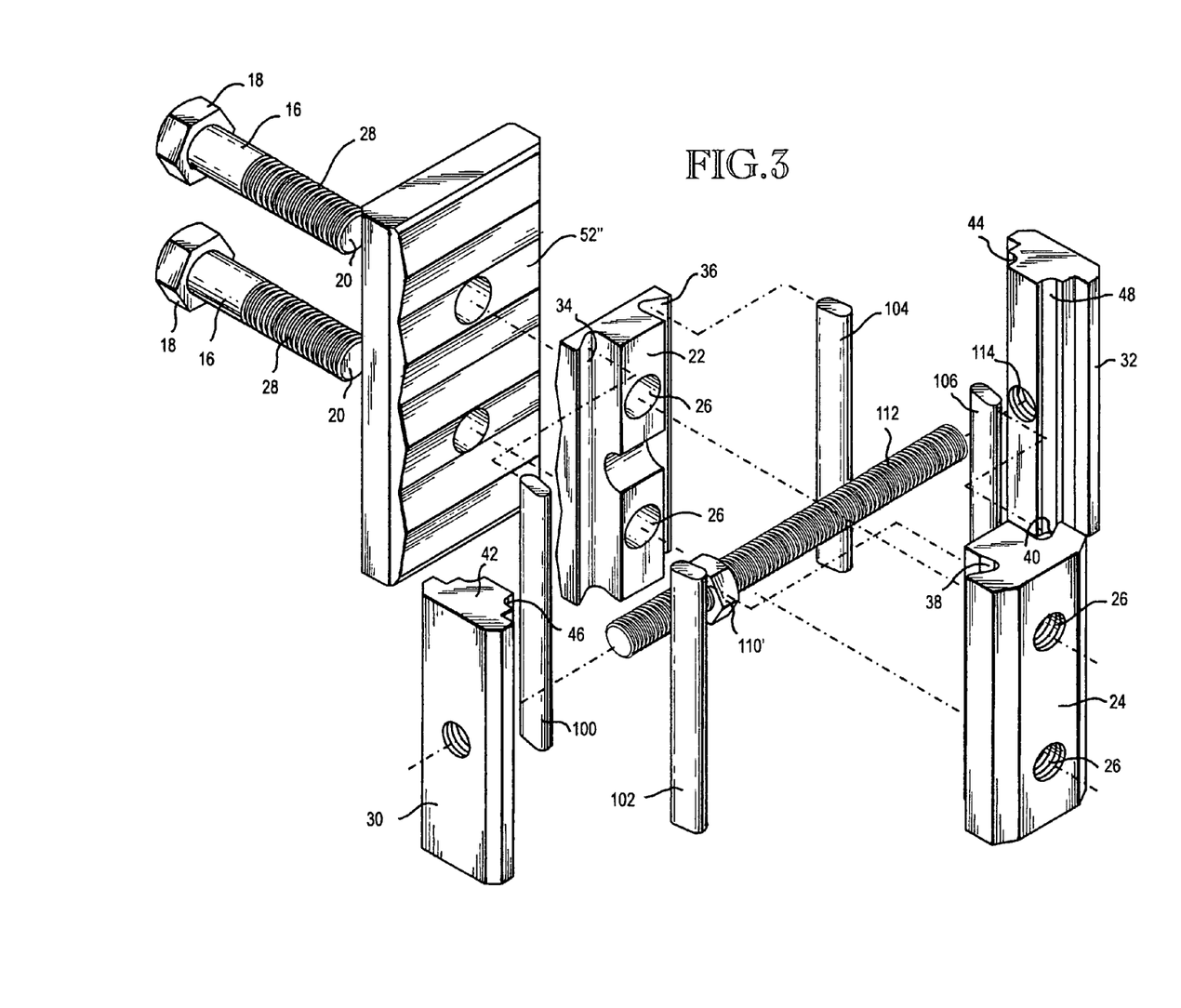
FIG. 3 is an exploded pictorial view of an embodiment of the present invention, showing the components of the mechanism that pulls on the elongated member connected to the upper clamp in response to a rotation of a horizontal screw that is accessible through one end of the transverse drive beam.

Referring to FIGS. 3–8, the mechanism for moving the upper clamp member 52" towards the lower clamp member 54" includes at least one but preferably a plurality of elongated members 16. In the illustrated embodiment, the elongated members are bolts 16 having heads 18 and threaded shanks 20. The threaded shanks 20 extend downwardly through openings in the upper clamp member 52", then through openings in the clamp member 54" and the top wall of the transverse drive beam 56". Then, the shank portions 20 continue downwardly through openings in an upper spread bar 22 and then engage a lower spread bar 24. In the illustrated embodiment, the lower spread bar 24 includes an internally threaded opening 26 and threads 28 on the elongated member 16 mate with the threads 26 in the threaded opening in the lower spread bar 24. The mechanism for pulling on the elongated members 16 also includes a pair of spaced apart squeeze bars 30, 32. The spread bars 22, 24 are spaced vertically apart and they have side edges. The squeeze bars 30, 32 are spaced horizontally apart and they are positioned outwardly adjacent the side edges of the spread bars 22, 24. The spread bar 22 has a pair of parallel grooves 34, 36 that are directed downwardly (FIG. 3). The spread bar 24 has a pair of parallel grooves 38, 40 (FIG. 3).

Squeeze bar 30 includes a pair of parallel grooves 42, 46 (FIG. 3). Squeeze bar 32 includes a pair of parallel grooves 44, 48 (FIG. 3). Four cam bars 100, 102, 104, 106 are positioned between the spread bars 22, 24 and the squeeze bars 30, 32. Cam bar 100 has a rounded upper edge that fits within the rounded groove 34 and a rounded lower edge that fits within the rounded groove 42. Cam bar 102 has a rounded upper edge that fits within the rounded groove 46 and a rounded lower edge that fits within the rounded groove 38. Cam bar 104 has a rounded upper edge that fits within rounded groove 46 and a rounded lower edge that fits within rounded groove 44. Cam bar 106 has a rounded upper edge that fits within rounded groove 48 and a rounded lower edge that fits within rounded groove 40.

Figure 5:
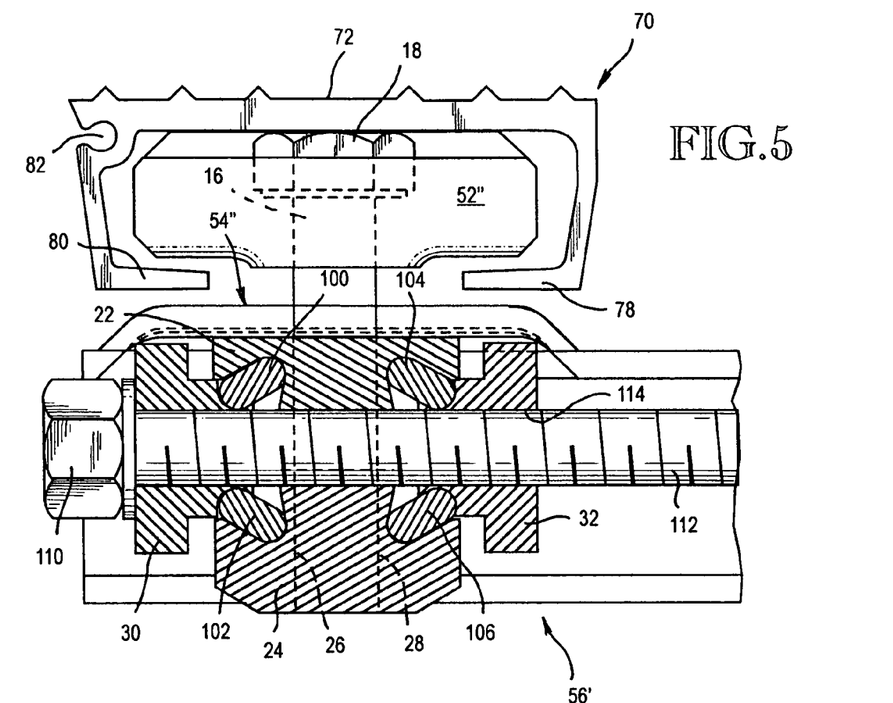
FIG. 5 is a sectional view taken substantially along line 5—5 of FIG. 4, such view showing the squeeze bars positioned relatively apart and the cam bars in leaning positions.

FIG. 5 shows the squeeze bars 30, 32 moved apart a sufficient distance that the cam bars 100, 102, 104, 106 take leaning positions when they are in the grooves. Bars 100, 104 lean inwardly towards each other. Bars 102, 106 lean outwardly away from each other. When the squeeze bars 30, 32 and the spread bars 22, 24 are in the position shown by FIG. 5, the elongated members 16 are inserted downwardly through openings in the upper clamp member 52", then through openings in the lower clamp member 54", then through the upper spread bar 22, and then into the lower spread bar 24. The head 18 is grasped by a wrench (not shown) and is rotated to screw the threaded shank 28 into the threaded opening 26. Then, the conveyor slat 70 is slid endwise along the upper clamp member 52' in order to place the bottom flanges 78, 80 in the space vertically between the upper and lower clamp members 52", 54". When the conveyor slat 70 is properly positioned, the nut 110 on the screw 112 is rotated to cause the threads on the screw 112 to move through the threaded opening 114 in squeeze bar 32. As it is rotated, the head 110 bears against a washer that is between it and the squeeze bar 30. As the threads on the screw 112 travel through the threads 114, the two squeeze bars 30, 32 are moved relatively together. As they move, they push on the lower edges of cam bars 100, 104 and on the upper edges of the cam bars 102, 106. This causes the cam bars 100, 102, 104, 106 to rotate in position from the leaning position shown by FIG. 5 into a more upright position shown by FIG. 6. As they rotate, the cam bars 100, 102, 104, 106 push the spread bars 22, 24 relatively apart. Spread bar 22 cannot move, so all of the movement is imposed on spread bar 24. Spread bar 24 is moved downwardly and it pulls with it the member 16. As member 16 moves downwardly, it pulls with it the upper clamp member 52", moving it against the lower flanges 78, 80 on the conveyor slat 70. FIG. 4 shows the flange 80 resting on the undulating surface on top of clamp member 54". It shows the undulating surface on the bottom of clamp member 52" resting on the flange 78. As the upper clamp member 52" moves further downwardly, its projections push portions of the flanges 78, 80 into recesses formed in the clamp member 54". The bottom flanges 78, 80 on the slat 70 are deformed in the manner shown by FIG. 2. The deformation of the bottom flanges 78, 80 firmly locks the conveyor slat 70 to the transverse drive beam 56'.

Figure 6:
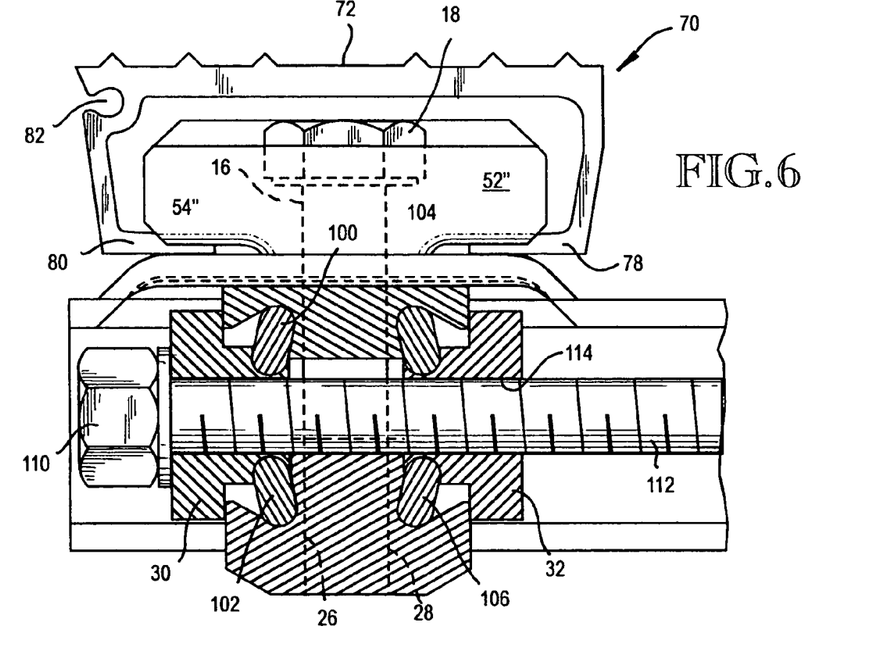
FIG. 6 is a view like FIG. 5 but showing the screw rotated to move the two squeeze bars together and move the cam bars into substantially upright positions, for causing a downward movement of the lower spread bar, causing it to pull or draw the elongated member downwardly and the upper clamp member against the bottom flanges of the conveyor slat.
Figure 7:
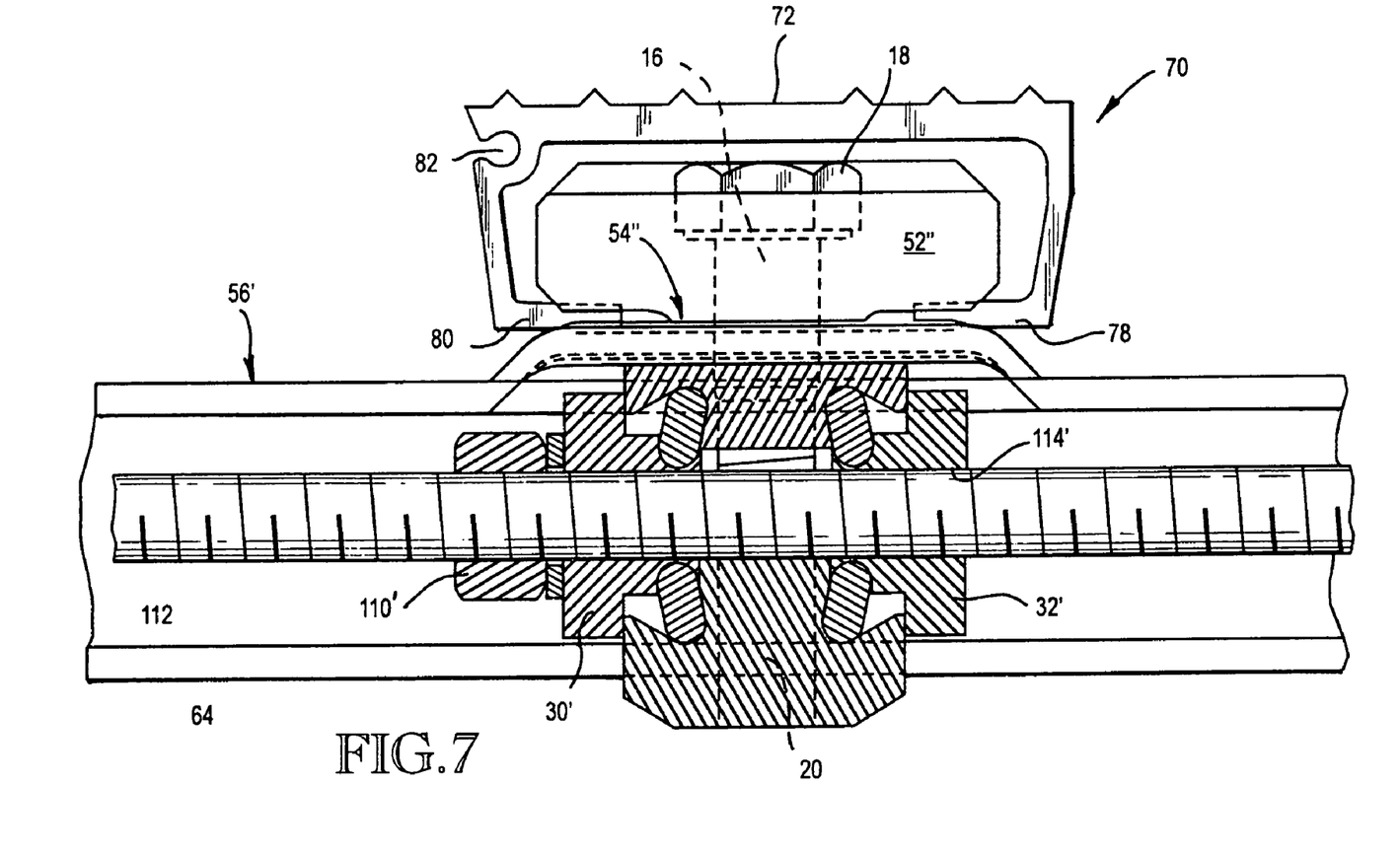
FIG. 7 is a view like FIG. 6 showing the horizontal screw extending onto the clamp control mechanism for the next conveyor slat and then continuing on from that mechanism to the clamp mechanism for the remaining conveyor slats.
Figure 8:
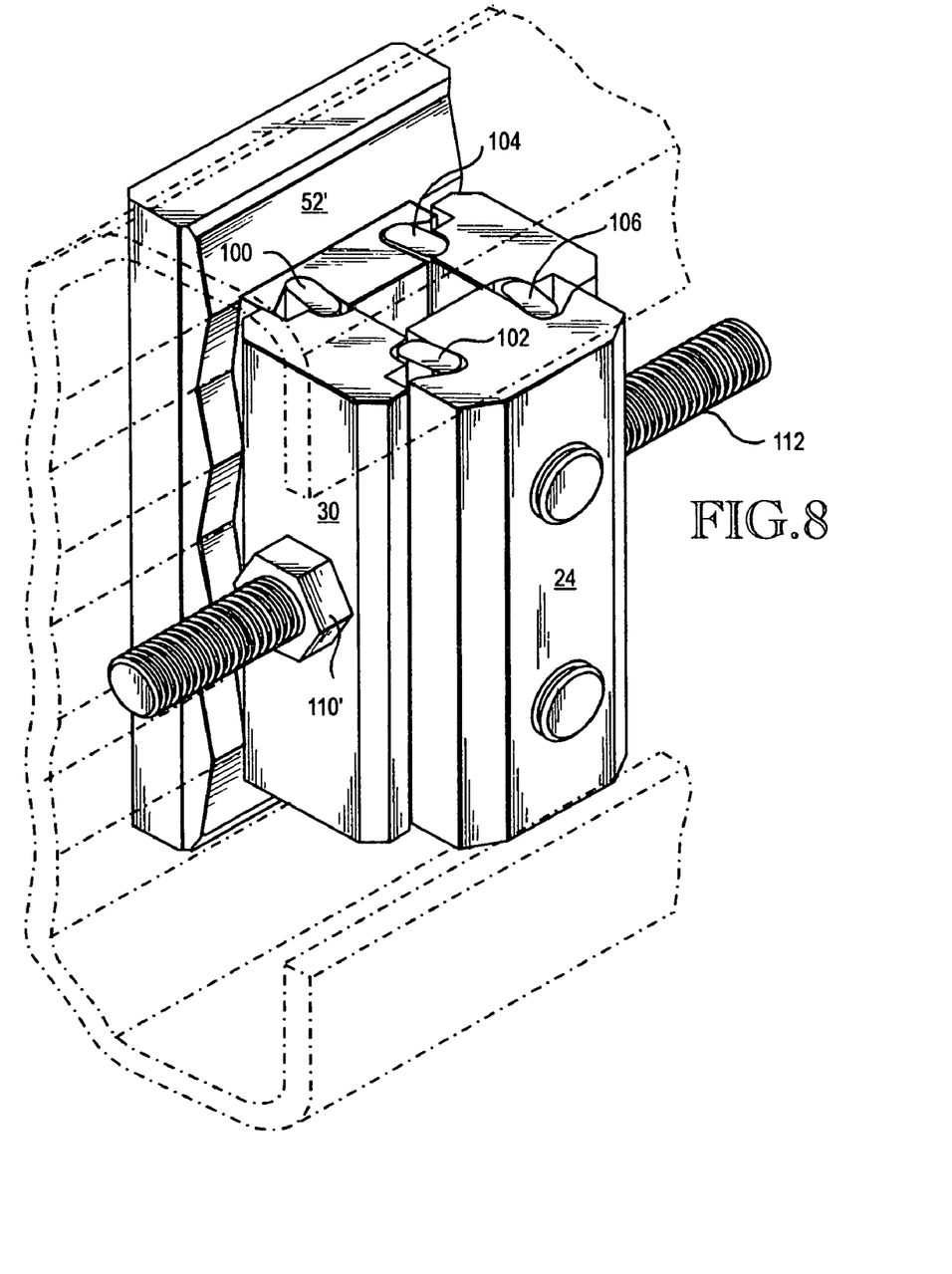
FIG. 8 is a view like FIG. 3 but showing the parts assembled.

FIGS. 5 and 6 show the clamp mechanism that is associated with the slat 70 at one end of the transverse drive beam 56'. Similar clamp assemblies are associated with each of the other slats 70 of the same set. FIG. 7 shows the second slat 70 spaced inwardly from the slat 70 shown by FIGS. 5 and 6. The screw 112 extends into and through the opening in squeeze bar 30' and then screws into the threaded opening 114' in squeeze bar 32'. It then continues onto the next clamp assembly for the third slat 70, and then onto each of the other slats 70 and their clamp assemblies, in sequence. Accordingly, in this embodiment, rotation of the screw head 10 will rotate the entire screw 112 and operate the clamping mechanisms for all of the slats 70 of the set. The other two sets of slats 70 are provided with like clamping mechanisms for each of their slats 70.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather are to be determined by the following claims, interpreted according to accepted doctrines of patent claim interpretation, including use of the doctrine of equivalents and reversal of parts.

What is claimed is:

1. Apparatus for pulling an elongated member endwise, comprising:
    a pair of spaced apart, top and bottom spread bars, said spread bars having opposite sides;
    an elongated member extending downwardly through an opening in the top spread bar and being connected to the bottom spread bar;
    a pair of spaced apart, first and second squeeze bars positioned outwardly of the sides of the spread bars;
    a horizontal screw extending through the first squeeze bar and threading into a threaded opening in the second squeeze bar, said screw extending perpendicular to the elongated member and having a head in contact with the first squeeze bar;
    cam bars having first edges engaging the spread bars and second edges engaging the squeeze bars;
    said squeeze bars and said screw being adapted to move the squeeze bars relatively together in response to a rotation of the screw in a first direction; and
    said spread bars, said squeeze bars and said cam bars being adapted to move the bottom spread bar downwardly and away from the top spread bar in response to such rotation of the screw in the first direction, wherein said movement of the bottom spread bar causes the bottom spread bar to pull with it the elongated member.

2. The apparatus of claim 1, wherein the cam bars have rounded first and second edges and the spread bars and the squeeze bars include rounded grooves for receiving the rounded first and second edges of the cam bars.

3. The apparatus of claim 2, wherein the squeeze bars have a first position in which they are spaced apart a predetermined distance, and wherein in said first position the cam bars converge as they extend from their the squeeze bars to the spread bars, and wherein a movement of the two squeeze bars relatively together will push on the second ends of the cam bars and swing the cam bars towards generally upright positions, causing the cam bars to push the spread bars relatively apart.

4. The apparatus of claim 1, wherein the elongated member is connected to the bottom spread bar by external threads on the elongated member and internal threads in an opening in the bottom spread bar.

5. The apparatus of claim 1, comprising an elongated channel member having a top and an inner space, and said spread bars, said squeeze bars and said cam bars being assembled together within said inner space, and said spread bars, squeeze bars and cam bars extending across the channel member; and
    said elongated member extending through an opening in the top of the channel member and then through the top spread bar.

6. The apparatus of claim 5, wherein a top clamp member and a bottom clamp member are positioned above the top of the channel member, and said elongated member is connected to the top clamp member and extends from it through an opening in the bottom clamp member, then through the opening in the top of the channel member, and then through the opening in the upper spread bar, and then connecting to the lower spread bar.

7. Apparatus for connecting a reciprocating conveyor slat having an inner space and laterally spaced apart bottom flanges, to a drive beam that is situated below the bottom flanges, said apparatus comprising:
    an elongated upper clamp member fitable into the inner space of the conveyor slat and having side portions positionable above the bottom flanges;
    an elongated lower clamp member connected to the drive beam and having portions below the bottom flanges;
    an upper spread bar carried by the drive beam below the lower clamp member, said upper cam bar being elongated in the same direction as the clamp members and including upper cam surfaces;
    a lower spread bar below and spaced from the upper cam bar, said lower cam bar also being elongated in the same direction as the clamp members and including lower cam surfaces;
    said upper and lower spread bars including side edges;
    at least one draw rod extending through an opening in the upper spread bar and connected to the lower spread bar;
    laterally spaced apart squeeze bars outwardly of the side edges of the upper and lower spread bars, said squeeze bars having cam surfaces spaced from the cam surfaces on the spread bars;

cam bars positioned vertical between the cam surfaces on the upper and lower spread bars and the cam surfaces on the squeeze bars;

aligned openings extending laterally through the squeeze bars, vertically between the upper and lower wedge bars, wherein at least one of the squeeze bars includes internal threads in its opening;

a bolt extending laterally through the aligned openings in the squeeze bars, said bolt having a head that bears against a first said squeeze bar and threaded shank that screws into the threaded opening in a second sound said squeeze bar, said bolt being adapted to draw the two squeeze bars together when the bolt is rotated to move it into the threaded opening in the second squeeze bar; and said cam surfaces on said cam and squeeze bars being adapted to rotate the cam bars in position and cause the cam bars to move the lower spread bar away from the upper spread bar and pull the draw rod and the upper clamp member downwardly against the bottom flanges of the conveyor slat, whereby the flanges of the conveyor slat are clamped by and between side portions of the upper and lower clamp members, allowing the conveyor slat to be connected to the drive beam without the need of fastener holes in the top of the conveyor slat.

* * * * *